May 9, 1967          E. G. ABDUL          3,319,093

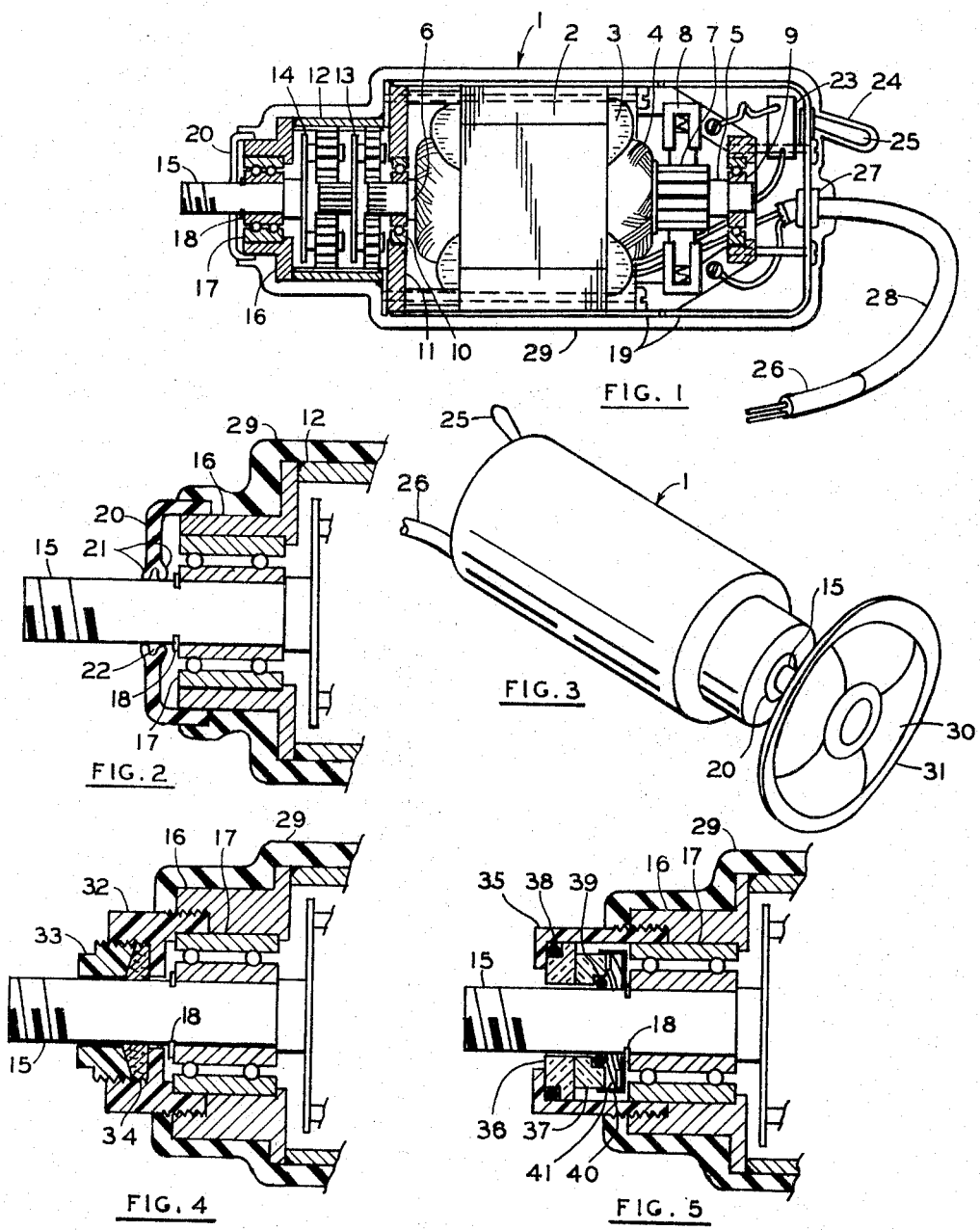

SUBMERSIBLE APPLIANCE DRIVER WITH INSULATED HOUSING

Filed Nov. 15, 1965          2 Sheets-Sheet 2

INVENTOR.
ELSIE G. ABDUL
BY
Leonard M. Todd

United States Patent Office 3,319,093
Patented May 9, 1967

3,319,093
SUBMERSIBLE APPLIANCE DRIVER WITH INSULATED HOUSING
Elsie G. Abdul, New York, N.Y., assignor of fifteen percent to Leonard M. Todd, New York, N.Y.
Filed Nov. 15, 1965, Ser. No. 516,210
4 Claims. (Cl. 310—50)

This invention relates to a portable, insulated, submersible, non-ventilated electric motor operated appliance driver in which an electric motor is connected through reduction gears to rotate an external shaft at relatively low speed and to which devices such as scouring pads, polishing implements, brushes, mixers, drills and the like may be coupled, for the scouring of pots and dishes and general household and industrial cleaning or polishing or light industrial machining, while eliminating shock hazard to the user when the invention is submerged in water or operated in a watery environment.

This application is a continuation-in-part of my co-pending application Ser. No. 277,736, filed May 3, 1963, now abandoned, for the same invention and which is superseded by the present application.

The principal object of this invention is to provide a portable power tool for the cleaning and scouring of household articles or for general or industrial cleaning while operating submerged in water or in a watery environment safely and without shock hazard to the user.

An object of this invention is that it also be useful to operate out of water. A further object is to provide a small hand held tool which materially reduces the physical effort required for the cleaning and scouring of household articles or general or industrial cleaning when this is undertaken by hand.

The prior art recognizes the utility of portable drivers for household appliances but does not teach or provide water resistance, which is of the greatest importance in order for the machine to be used safely while submerged in water, at a kitchen sink for example, or for cleaning generally in a moist environment or when water is the cleaning medium. While submersible motors and totally enclosed, non-ventilated motors are known, their application together with reduction gearing, shaft sealing means and an insulating housing to protect the user from shock, to the objectives of the present invention, has not been hitherto recognized nor taught.

The prior art teaches many scouring attachments for the employment of scouring pads and a similar attachment is taught here.

The problems to be overcome in this invention are (1) to prevent water leakage into the motor and gearing and (2) to protect the user from shock hazard. Water leakage will cause damage by corrosion to the motor and gearing and cause electrical leakage from the motor to the user in whose hand the appliance driver is held. Moreover, electrical leakage may occur in the line cord by cracking of the insulation, particularly by flexure near the entry of the cord into the housing of the appliance driver. The sites which must be protected therefore are (a) the housing itself, (b) the point at which the shaft leaves the housing, (c) the switch where one is used, (d) the juncture of the line cord with the housing and (e) the line cord, at least.

In the drawings:

FIGURE 1 is a cross-sectional view of the appliance driver with elastic membrane compression seal.

FIGURE 2 is a cross-sectional detail view of the elastic membrane compression shaft seal.

FIGURE 3 is a perspective view of the appliance driver with a resilient backing disc and steel wool scouring pad coupled to the low speed drive shaft.

FIGURE 4 is a cross-sectional detail view of the stuffing box shaft seal.

FIGURE 5 is a cross-sectional detail view of the mechanical rotary shaft seal.

Figure 6:
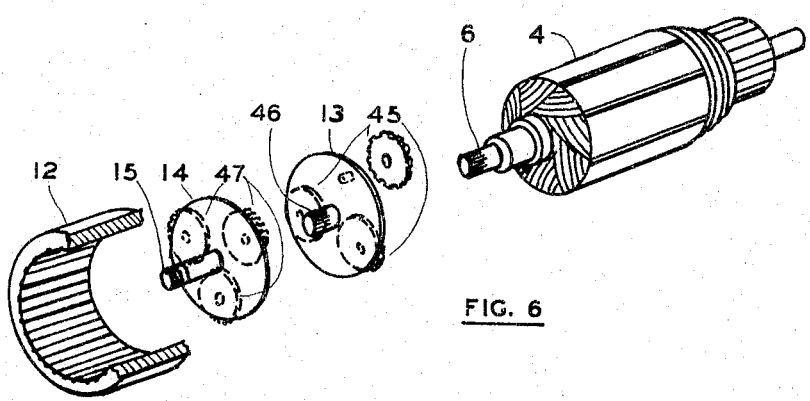
FIGURE 6 is a cut away view of the major elements of the power train comprising the armature and double reduction planetary gear head of the appliance driver.

In FIGURE 1 the universal motor 1 includes stator laminations 2 on which field windings 3 are wound, armature 4 mounted on shaft 5 and 6, commutator 7, brushes and brush holders 8 and ball bearings 9 and 10. Wall 11 serves as a mounting for ball bearing 10 and prevents lubricant and oil fumes from within the gear head from entering the motor and fouling commutator 7.

The motor is of the universal type which is compact and efficient having a high ratio of power to weight and power to size and is preferred to induction motors. Permanent magnet field commutator motors have comparable ratios of power to weight and size to universal motors and may also be used; with such motors a rectifier may increase efficiency and be disposed either within the housing of the appliance driver or within the housing of a voltage stepdown transformer. The field magnet of these motors may be metallic or ceramic, for example, barium ferrite.

Induction motors require a capacitor to attain maximum torque which is lower than the torque of universal motors of comparable size and require substantial space when incorporated in the motor housing. The power-size-weight ratios of induction motors may be improved by increasing the rotational speed of the armature, for example by reducing the number of field poles and by increasing the frequency of the supply voltage. Keeping this in mind, an induction motor may be used.

In the size and power required, about 1/50 H.P., a totally enclosed non-ventilated motor is adequate; no ventilating air stream is necessary for cooling since the rate of temperature rise is slow. When the appliance driver is operated under full load for an extended period, the temperature of the housing may be reduced by momentary immersion in water.

In general, a supply voltage of 5 to 12 volts causes a small hazard to the user from shock and at this voltage a good grade of lamp cord may be used for line cord 26 with relative safety. While the supply voltage may be obtained from dry batteries, battery replacement results in relatively high cost of operation and their large size and weight for this service is a drawback. Low voltage storage batteries are large, heavy, of high initial cost and require frequent recharging. The appliance driver may be operated with great safety by employing a well-insulated stepdown transformer located near the electric line plug or the plug may be incorporated into the transformer housing. Since the current drain is negligable when the motor is not operating, the device may remain plugged into the electrical outlet for long periods with no damage and little current consumption. The device may be permanently connected to the line. The preferred range of voltage at the transformer secondary is 5 to 12 volts although with adequate precautions the device may be operated directly from the 117 volt line.

The reduction gears are of the double planetary type which require small space for relatively large speed reduction; double or triple reduction spur gears may be used as is common in portable electric drills. See FIG- URE 7. Bevel or worm gearing may be used. Ball bearings or sleeve bearings may be employed equally well.

Ring gear 12 serves both first reduction planetary gear set 13 and second reduction planetary gear set 14 to which output shaft 15 is attached. Flange 16 is attached to ring gear 12. Shaft 15 may be threaded or grooved, or a square end with ball detent or snap fastener connectors or similar quick connect-disconnect mechanisms. The first planetary gear set 13 comprises the carrier and planetary gears; the sun gear, high speed pinion cut in shaft 6, meshes with this input portion, the planetary gears. The output sun gear on the opposite side of the carrier meshes with the input portion, the planetary gears of second reduction gear set 14 comprising the carrier and planetary gears. The output shaft 15 is mounted on the opposite side of the carrier of second reduction gear set 14. Double row ball bearings 17 withstand lateral and axial thrust and shielding (not shown) aids in resisting the intrusion of water. Retaining ring 18 is set in a groove in shaft 15 to maintain the shaft in fixed relation to bearings 17 and to ring gear 12, flange 16 and housing 19. Shaft 15 is of plastic material of high impact strength such as nylon, polyvinyl chloride or the like to lengthen the electrical leakage path from the windings and commutator to the hand of the user; the shaft may be metallic with a somewhat reduced factor of safety.

The gearhead is defined by ring gear 12, flange 16 and wall 11; the other side of wall 11 and casing 19 comprise the motor casing. Rotary shaft seal 20 is an elastic membrane of rubber or similar material with a circular opening slightly smaller in diameter than shaft 15; distention of the opening by the shaft produces a tension in the membrane and compression on the shaft serving to resist the pressure head of external fluids such as air or water and curtailing their leakage or intrusion into the gearhead. Gear oil of soft grease lubricant within the gearhead coats the interior surface of the gearhead, flange, wall, gears and bearings. Such lubricant is water repellant and surface adherent and contains corrosion inhibitors, counteracting the corrosive effect of any water which might leak into the gearhead. Water containing dissolved soap or detergent might creep through the shaft seal into the gearhead, forced by a small pressure head or by capillarity. However the water repellancy of the lubricant and its surface adherence will counteract this tendency, resisting the intrusion of water first into the gearhead and thence into the motor casing through wall 11. This lubricant functions as a sealing means or comprises a part of sealing means, together with a sleeve bearing or shielded ball bearing. The diaphragm seal 20 may be eliminated in this construction.

Toggle switch 23 is attached to the end bell portion of housing 19 and is waterproofed by toggle switch rubber boot 24 which fits over bat handle 25 of said toggle switch. Other waterproof switches may be used or the switch may be remote from the motor; it may be located in the line cord for example.

Line cord 26 is preferably of high-strength reinforced rubber insulating the conductors and is protected from being pulled away from the housing, especially by sharp or sudden tension stresses by strain relief bushing 27. This bushing may be vulcanized onto the line cord or may be of the compression type or be located within the housing. Tubular reinforcement 28 extends over line cord 26 for several inches beyond the bushing for the purpose of resisting cracking by flexure where it is usually severe, may be vulcanized to the cord or form a part of it, and may be reinforced with fiberglass or the like.

Housing 19 including the end bell portion, ring gear 12 and flange 16 are covered with insulating rubber or plastic layer 29 which may be applied by dipping and vulcanizing or by molding. Housing 19 may be replaced with plastic molding 19 serving as an insulator and structural support for motor 1, ring gear 12 and flange 16 and will function to keep water from the interior of the motor and gear case and to prevent electrical leakage or shock to the user as does rubber layer 29.

Rotary shaft seal 20 is of rubber, has a circular opening slightly smaller in diameter than shaft 15; the insertion of the shaft into the opening therefore distends the opening, causing tension in the rubber seal and compression against shaft 15, which resists the passage of air or water, and prevents leakage. In FIGURE 2, the two ribs 21 on seal 20, have between them space 22 filled with lubricant to minimize friction of the compression of the seal against the shaft. This type of seal is adequate for low shaft speed and low pressure heads. The rubber diaphragm type seal is preferred because of its compactness although a wide variety of sealing means may be employed. See FIGURES 4 and 5. This invention is not limited to one particular type of seal.

In FIGURE 3 the assembled appliance driver is shown together with a steel wool scouring pad 30 mounted on a resilient backing pad 31. Quick attachment snap fastener means provides ease of replacement when the scouring pad becomes worn. Food mixers, a drill chuck, brushes, polishing or cleaning devices or the like may be attached to shaft 15. Diaphragm seal 20 is shown and other sealing means may be used. In FIGURE 4 a stuffing box seal is shown. Stuffing box 32 is threaded into flange 16. Packing nut 33 is threaded within stuffing box 32 compressing packing 34 against shaft 15 in sealing relation. Packing nut 33 may be tightened periodically to take up for wear of the packing. This seal is suited to high hydrostatic pressures and high vacuums and will serve in low head domestic applications. Rubber layer 29 or plastic molding 19 also extend over stuffing box 32.

Rotary mechanical shaft seal in FIGURE 5 is suited to high head or vacuum industrial applications and to household use and has a lower friction loss than the stuffing box for resistance to a given fluid pressure head. Retainer 35 is threaded into flange 16 and holds the seal in place, at one end while washer 40 holds the seal at the other end. Spring 41 of waved washer shape, exerts a compressive force on stationary seal ring 36 and rotating seal ring 37 so that the lapped surfaces of these rings bear against each other in sealing relation, resisting the intrusion of fluid past shaft 15 to ball bearing 17. Rubber O grommet ring 38 seals stationary ring 36 to retainer 35 and rubber O grommet ring 39 seals rotating seal ring 37 to shaft 15. O rings 38 and 39 do not rotate with respect to ring 36 and ring 37 respectively and suffer little wear in use. Rubber layer 29 or plastic molding 19 also extend over retainer 35.

FIGURE 6 shows the relation of armature to gearhead of the appliance driver of FIGURE 1. Armature 4 is mounted on shaft 6 and a pinion is cut in the end of shaft 6 meshing with the input portion of first planetary reduction gear set 13 comprising three planet gears 45 which rotate on shafts mounted on planet gear carrier 13. Sun gear 46 is centrally attached to the opposite face of planet gear carrier 13 and meshes with the input portion of second planetary reduction gear set 14 comprising three planet gears 47 which rotate on shafts mounted on planet gear carrier 14. Output shaft 15 is centrally attached to the opposite face of planet gear carrier and is threaded. Planet gears 45 and 47 both mesh with ring gear 12.

Figure 7:
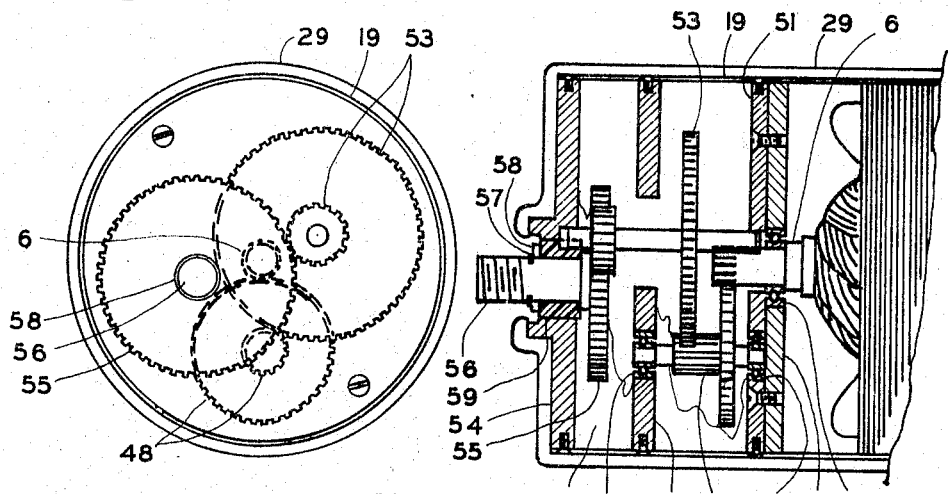
FIGURE 7 is a cut away front view and sectional side view of a triple reduction spur gear head for the appliance driver.

In FIGURE 7, a spur gear head is shown wherein a pinion is cut in the end of armature shaft 6 and meshes with the gear of first reduction gear and pinion 48, the shaft ends of which are mounted in ball bearings 49 and 50 set in end plate 51 and intermediate plate 52, respectively. The pinion of gear and pinion 48 meshes with the gear of second reduction gear and pinion 53, the shaft of which is carried in bearings located in end plate 51 and front plate 54. The pinion of gear 53 meshes with third reduction output gear 55 on which threaded output shaft 56 is carried. Retaining ring 57 sits in a groove in shaft 56 maintaining a limited clearance between thrust washer 58 and the end of sleeve bearing 59 which may be plastic or an oil impregnated sintered bronze bearing or the like. Bearing 59 takes up lateral and axial thrust exerted from the driven appliance against shaft 56 and sleeve bearing 59 functions as a seal in connection with lubricant 60 which coats the gears and internal surfaces of the gearhead. Ball bearings, roller bearings or other anti-friction bearings may be used.

Figure 8:
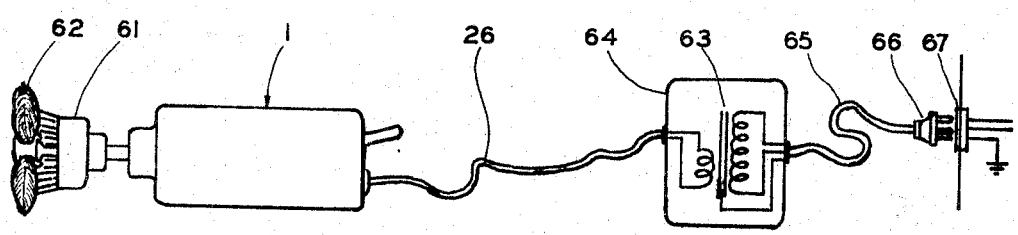
FIGURE 8 is an arrangement and circuit diagram of the appliance driver, voltage stepdown transformer and three prong electrical plug with grounding lead.

In FIGURE 8, appliance driver 1 is coupled to brush 61 and scouring pad 62 and is connected by line cord 26 to secondary of stepdown transformer 63 located in housing 64 which furnishes a voltage in the order of 5 to 12 volts to the appliance driver. The primary of transformer 63 is connected by three conductor line cord 65 to three prong plug 66 which is inserted into wall outlet 67 connecting the primary of the transformer to 117 volts A.C. and the transformer laminations to ground. Other line voltages or D.C. may be used or a two conductor line without ground may be used with lower safety. Where the design requires, a rectifier such as a silicon diode may be incorporated in the circuit between the secondary of transformer 63 and appliance driver 1 situated either in the appliance driver housing or in transformer housing 64. A fuse may be included in the secondary or primary circuit, disposed in housing 64.

A motor rating of 1/50 H.P. at a no-load shaft speed of 500 r.p.m. is adequate to this service. The size of a typical unit is 3½ inches long and 1½ inches in diameter weighing 1 pound. The sealed construction will permit the device to be used industrially in explosive atmospheres, in aircraft or spacecraft at high altitude, submerged under high heads of liquid or subjected to high heads of gas.

I claim:

1. A submersible appliance driver comprising a universal electric motor, a rotating shaft for said motor, double planetary reduction gears having a low speed output shaft and a high speed input portion, said rotating shaft of said electric motor coupled to said high speed input portion, a housing substantially completely enclosing said electric motor and said reduction gears, the outer surface of said housing comprising an electrically insulating material, said housing being impermeable to water, preventing the intrusion of water to within said housing when said housing is submerged in water, said low speed shaft extending exteriorly of said housing through rotary shaft sealing means comprising an elastic membrane fastened to said housing, a circular opening in said membrane normally smaller in diameter than the diameter of said low speed shaft and through which circular opening said low speed shaft extends, said opening being distended by said low speed shaft and compressed against said low speed shaft in sealing relation to said low speed shaft and said housing and a line cord for applying electric power to said electric motor passing into said housing through sealing means in sealing relation to said line cord and said housing and thence passing through a strain relief bushing mounted on said housing, said line cord connected to said electric motor within said housing.

2. A submersible appliance driver comprising an electric motor, a rotating shaft for said motor, double planetary reduction gears having a low speed output shaft and a high speed input portion, said rotating shaft of said electric motor coupled to said high speed input portion, a housing substantially completely enclosing said electric motor and said reduction gears, the outer surface of said housing comprising an electrically insulating and water-impermeable material, said housing preventing the intrusion of water to within said housing when said housing is submerged in water, said low speed shaft extending exteriorly of said housing through rotary shaft sealing means comprising a rotary mechanical shaft seal in sealing relation to said low speed shaft and said housing, said rotary mechanical shaft seal comprising a stationary sealing ring coaxial with said low speed shaft, in sealed relation to and rotating with said low speed shaft, each of said sealing rings having a lapped surface, each of said lapped surfaces facing the other of said lapped surfaces, and a spring urging said lapped surfaces axially against each other in sealing relation to said low speed shaft and said housing, and a line cord for applying electric power to said electric motor passing into said housing through sealing means in sealing relation to said line cord and said housing and thence through a strain relief bushing mounted on said housing, said line cord connected to said electric motor within said housing.

3. A submersible appliance driver comprising a permanent magnet field, commutator type electric motor, a rotating shaft for said motor, triple reduction rotational spur gears having a low speed shaft and a high speed input portion, said rotating shaft of said electric motor coupled to said high speed input portion, a housing substantially completely enclosing said electric motor and said reduction gears, the outer surface of said housing comprising an electrically insulating and water impermeable material, said housing preventing the intrusion of water to within said housing when said housing is submerged in water, said low speed shaft extending exteriorly of said housing through rotary shaft sealing means comprising a stuffing box shaft seal in sealing relation to said low speed shaft and said housing, said stuffing box shaft seal comprising a stuffing box attached to said housing, packing within said stuffing box, coaxial with and surrounding said low speed shaft and a packing nut compressing said packing against said shaft and said stuffing box in sealing relation to said shaft and said housing, a line cord for applying electric power to said electric motor passing into said housing through sealing means in sealing relation to said line cord and said housing and thence through a strain relief bushing mounted on said housing, a switch mounted within said housing, an operating lever for said switch, said operating lever extending exteriorly of said housing, and a rubber insulating boot covering said operating lever, the base of said insulating boot and said housing joined in sealing relation to each other, said switch, said line cord and said electric motor connected in series within said housing.

4. A submersible appliance driver comprising an electric motor, a rotating shaft for said electric motor, double planetary reduction gears having a low speed output shaft and a high speed input portion, said rotating shaft of said electric motor coupled to said high speed input portion, a housing substantially completely enclosing said electric motor and said reduction gears, the outer surface of said housing comprising an electrically insulating and water-impermeable material, said housing preventing the intrusion of water to within said housing when said housing is submerged in water, said low speed shaft extending exteriorly of said housing through rotary shaft sealing means comprising an elastic membrane fastened to said housing in sealing relation to said housing, a circular opening in said membrane normally smaller in diameter than the diameter of said low speed shaft and through which circular opening said low speed shaft extends, said opening being distended by said low speed shaft and compressed against said low speed shaft in sealing relation to said low speed shaft and said housing, a switch mounted within said housing, an operating lever for said switch, said operating lever extending exteriorly of said housing, a rubber insulating boot covering said operating lever, the base of said insulating boot and said housing joined in sealing relation to each other, a line cord for applying electric power to said electric motor passing into said housing through sealing means in sealing relation to said line cord and said housing and thence through a strain relief bushing mounted on said housing, said line cord, said switch and said electric motor connected in series within said housing, a voltage stepdown transformer remote from said appliance driver, a housing for said transformer, a primary and a secondary for said transformer, said line cord of said appliance driver extending within said transformer housing and connected therein to said secondary of said transformer, the voltage output of said secondary being in the order of ten volts for the purpose of reducing the shock hazard from electrical leakage from said appliance driver and said line cord to a person holding said appliance driver, and a second line cord, one end of said second line cord extending into said transformer housing and connected to said primary therein, the other end of said second line cord terminating in an electrical connector plug adapted to be inserted into an electrical outlet.

References Cited by the Examiner

UNITED STATES PATENTS

| | | | |
|---|---|---|---|
| 2,777,963 | 1/1957 | Kuntz | 310—43 |
| 2,944,297 | 6/1960 | Maynard | 310—87 |
| 3,089,071 | 5/1963 | Hartwig | 310—47 |
| 3,121,813 | 2/1964 | Pratt | 310—50 |

FOREIGN PATENTS 1,024,197  1/1953  France.

MILTON O. HIRSHFIELD, *Primary Examiner.*

J. W. GIBBS, *Assistant Examiner.*